(12) United States Patent
Crandall et al.

(10) Patent No.: US 7,607,019 B2
(45) Date of Patent: Oct. 20, 2009

(54) SMALL MEMORY FOOTPRINT FAST ELLIPTIC ENCRYPTION

(75) Inventors: Richard E. Crandall, Portland, OR (US); Douglas P. Mitchell, Lake Forest Park, WA (US)

(73) Assignee: Apple Inc., Cupertino, CA (US)

( * ) Notice: Subject to any disclaimer, the term of this patent is extended or adjusted under 35 U.S.C. 154(b) by 886 days.

(21) Appl. No.: 11/051,441

(22) Filed: Feb. 3, 2005

(65) Prior Publication Data

US 2006/0174126 A1 Aug. 3, 2006

(51) Int. Cl.
*H04L 9/32* (2006.01)
(52) U.S. Cl. .................... 713/176; 713/180; 380/30
(58) Field of Classification Search .......... 713/176, 713/180; 380/28, 30
See application file for complete search history.

(56) References Cited

U.S. PATENT DOCUMENTS

| | | | |
|---|---|---|---|
| 5,159,632 A | 10/1992 | Crandall | |
| 5,271,061 A | 12/1993 | Crandall | |
| 5,463,690 A | 10/1995 | Crandall | |
| 5,581,616 A | 12/1996 | Crandall | |
| 6,243,467 B1 * | 6/2001 | Reiter et al. | 380/30 |
| 6,285,760 B1 | 9/2001 | Crandall | 380/30 |
| 6,307,935 B1 | 10/2001 | Crandall et al. | |
| 6,466,668 B1 * | 10/2002 | Miyazaki et al. | 380/30 |
| 7,218,735 B2 * | 5/2007 | Coron et al. | 380/30 |
| 2003/0152218 A1 * | 8/2003 | Coron et al. | 380/30 |

OTHER PUBLICATIONS

Guajardo, Jorge, "Efficient Implementation of Elliptic Curve Cryptosystems on the TI MSP 430x30x Family of Microcontrollers" In K. Kim (Ed.): PKC 2001, LNCS 1992, pp. 365-382, Korea, Feb. 2001 © Springer-Verlag Berlin Heidelberg 2001.
Schroeppel, et al. "A Low-Power Design for an Elliptic Curve Digital Signature Chip" Presented at Sandia National Laboratories Aug. 14, 2002.
Crandall, Richard, *Prime Numbers A Computational Perspective*, © 2001 Springer-Verlag New York, Inc. Chapter 7-9.

\* cited by examiner

*Primary Examiner*—Ponnoreay Pich
*Assistant Examiner*—Kimyen Vu
(74) *Attorney, Agent, or Firm*—Morgan, Lewis & Bockius LLP

(57) ABSTRACT

A method of generating a digital signature includes generating a first random number from a finite field of numbers, and generating field elements defining a first point on an elliptic curve defined over the finite field of numbers by performing elliptic curve arithmetic on the first random number and an initial public point on the elliptic curve. The method continues by generating a product from a field element, a private key, and a second random number received from a challenger seeking verification of a digital signature, and generating a signature component by summing the product and the first random number. The signature component is reduced using one or more modular reduction operations, using a modulus equal to an order of the elliptic curve, and then the reduced signature component and the field elements are sent to the challenger as a digital signature for verification by the challenger.

22 Claims, 7 Drawing Sheets

Signature Signing and Verification System
100

SMALL MEMORY FOOTPRINT FAST ELLIPTIC ENCRYPTION

RELATED APPLICATIONS

This application is related to U.S. Provisional Application No. 60/642,340, filed Jan. 7, 2005, entitled "Accessory Authentication for Electronic Devices," which provisional application is incorporated herein by reference in its entirety.

This application is related to U.S. patent application Ser. No. 11/051,499, filed Feb. 3, 2005, entitled "Accessory Authentication for Electronic Devices," which application is incorporated herein by reference in its entirety.

COPYRIGHT AUTHORIZATION STATEMENT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The disclosed embodiments relate generally to asymmetric cryptography, and in particular to small memory implementations of fast elliptic encryption (FEE).

BACKGROUND

Since the advent of public-key cryptography numerous public-key cryptographic systems have been proposed. Today, only three types of systems are still considered secure and efficient. These systems include integer factorization systems, discrete logarithm systems and elliptic curve cryptography (ECC) systems. The security afforded by integer factorization rests on the difficulty of factoring a large product of two prime numbers. The security of discrete logarithm systems rests on the difficulty of solving the discrete logarithm problem (DLP). The security of ECC systems rests on the difficulty of solving the elliptic curve DLP (ECDLP) problem, which amounts to finding a log in a group of points defined on an elliptic curve over a prime field. ECC's advantage over other systems is that its inverse operation gets harder, faster, against increasing key length, making it suitable for portable devices having small form factors with limited power and memory.

In recent years FEE has emerged as a strong option for memory constrained devices due, in part, to its speed and efficiency. FEE uses special primes and fast finite field and modular operations to reduce processor cycles, leading to less power consumption and heat dissipation. Various embodiments of FEE systems are described in U.S. Pat. No. 6,307,935, issued Oct. 23, 2001, entitled "Method and Apparatus For Fast Elliptic Encryption With Direct Embedding," and U.S. Pat. No. 6,285,760, issued Sep. 4, 2001, entitled "Method and Apparatus For Digital Signature Authentication," each of which is incorporated herein by reference in its entirety. Although existing FEE systems provide reduced processor cycles, there remains a need for small memory implementations of FEE.

SUMMARY OF EMBODIMENTS

The disclosed embodiments provide small memory implementations of FEE. In one embodiment, a method of generating a digital signature includes generating a first random number from a finite field of numbers, and generating field elements defining a first point on an elliptic curve defined over the finite field of numbers by performing elliptic curve arithmetic on the first random number and an initial public point on the elliptic curve. The method continues by generating a product from a field element, a private key, and a second random number received from a challenger seeking verification of a digital signature, and generating a signature component by summing the product and the first random number. The signature component is reduced using one or more modular reduction operations, using a modulus equal to an order of the elliptic curve, and then the reduced signature component and the field elements are sent to the challenger as a digital signature for verification by the challenger.

DESCRIPTION OF EMBODIMENTS

Figure 1:
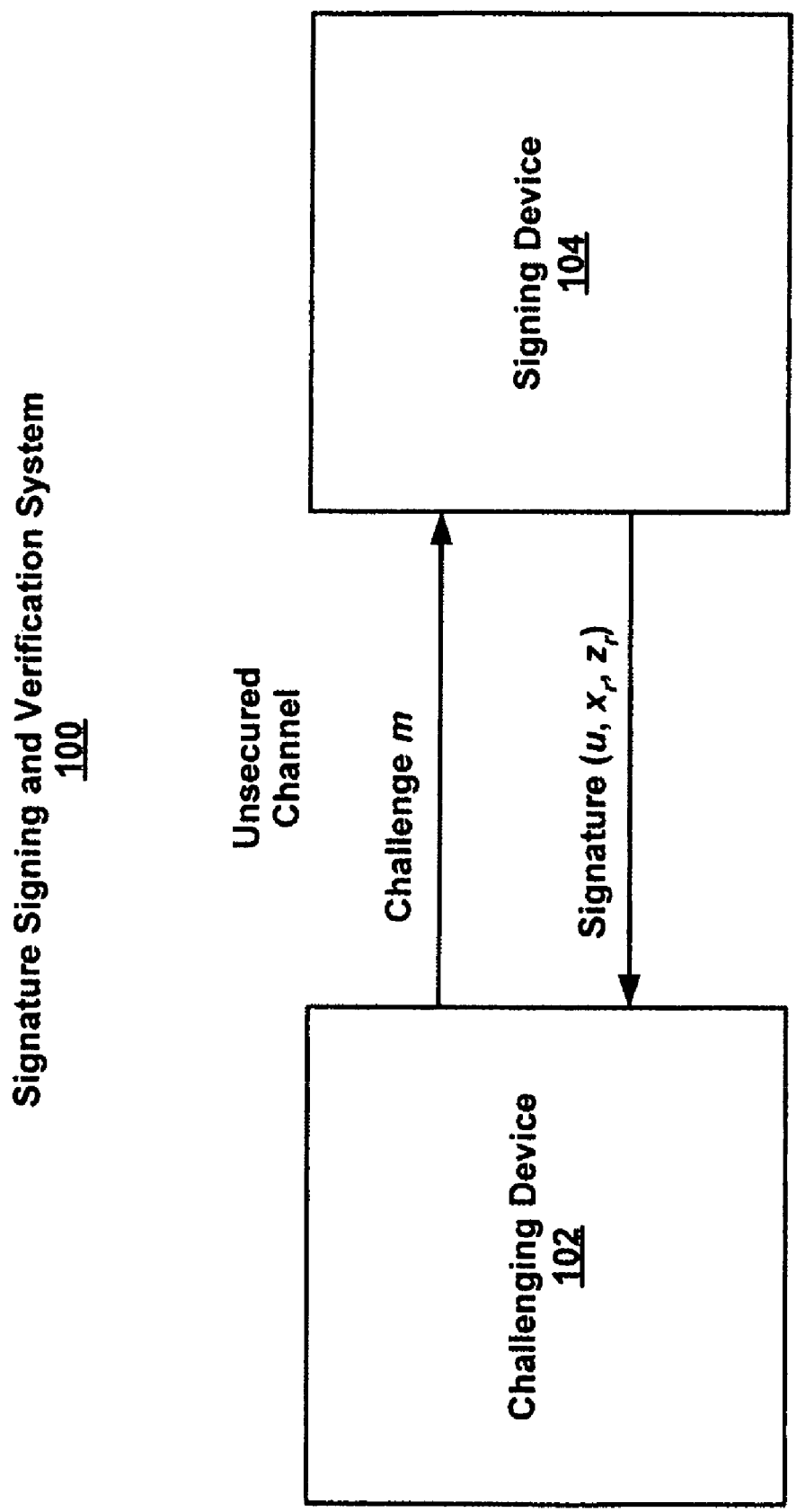
FIG. 1 is a block diagram of one embodiment of a signature signing and verification system.

The following description of embodiments assumes that the reader has a basic understanding of ECC and its underlying mathematics. A detailed discussion of ECC can be found in numerous publicly available references, such as D. Hankerson, A. Menezes, and S. Vanstone, *Guide to Elliptic Curve Cryptography*, Springer-Verlag, 2004. Asymmetric cryptographic systems and applications using Fast Elliptic Encryption (FEE) are described in U.S. Pat. Nos. 5,159,632 and 6,285,760.

Small Memory Fast Elliptic Encryption (SFEE)

The SFEE embodiments described herein were developed based on certain assumptions and defining constraints. First, an elliptic curve over finite field Fp for odd prime p was assumed to have an equation (in Montgomery form) given by $$y^2 = x^3 + cx^2 + x, \quad c \neq \pm 2, \tag{1}$$

wherein the parameters x and y are field elements describing a point (x, y) on the elliptic curve if x and y satisfy equation (1).

Next, it was assumed that the prime characteristic p given by $$p = w^s - k, \; k \in [1, w-1], \; k \equiv 1 \pmod{4}, \tag{2}$$

wherein w is a word size for the field arithmetic (e.g., 16 bits), and s is a chosen exponent, which can be used to set the security level of the SFEE.

For SFEE, specific elliptic curves are selected such that the curve order o is of the form $$o = w^s - j, \quad (3)$$

wherein j>0 and initial public points are selected with point orders that divide the curve order o and contain the largest prime number in the curve order o. Note that in some embodiments where, for example, 16×16, 32-bit machine operations are available, $w=2^{16}$ is an efficient choice for a word size. One may think of the exponent s as a security level, subject to the difficulty of breaking the ECDL problem. Thus, if $w=2^{16}$ and s=10, then 160 bit encryption can be achieved, i.e., $(2^{16})^{10}=2^{160}$. In some embodiments, extra optimization is possible when c in equation (1) is set equal to 4.

The foregoing SFEE assumptions and defining constraints imply both p, $o<w^s$. It also follows from the Hasse theorem that $0<j<w^{(1+s/2)}$, so that j can be about half the allocation of a typical (mod p) residue, if desired. It is also noted that Montgomery curves typically cannot have a prime curve order o. Rather, the curve order o should be divisible by 4. For maximum security, however, p can be selected such that o is divisible by a large prime.

SFEE Definitions of Software Variable Types

To facilitate discussion regarding the memory saving features of the disclosed embodiments the software types "lGiant" and "bGiant" will be assumed. lGiant means a "little giant" type and bGiant means a "big Giant" type. The actual number of bytes used to represent an lGiant or bGiant is dependent on the size in bits of the lGiant or bGiant.

Although lGiant and bGiant types are platform dependent, in some embodiments, these types have constrained upper limits. For example, an lGiant variable type is defined to have at most s+1 digits (i.e., arithmetic words) and one word to count significant digits. Thus, the number of significant digits in an lGiant is less than or equal to s+1. For example, if s=10 and a word is 16-bits, then an lGiant would occupy 22 bytes of storage. A bGiant type has at most 2s digits. Thus, the number of significant digits in a bGiant is less than or equal to 2s. For example, if s=10 and a word is 16-bits, then a bGiant would occupy 40 bytes of storage. The reason for the (s+1) digit upper limit on the lGiant type is that certain field arithmetic functions (such as adding two lGiants) results in another lGiant. This is due to each lGiant being a field element in the interval [0, p−1] and $2p−2<w^{s+1}$. Similarly, a vector multiply function used in SFEE, such as vecmulg(a, x); //Replace x with a*x, (4)

where a is one word and x is a field element, results in a modified x which is still an lGiant, because $ax \leq (w-1)(w^s-1) < w^{s+1}$. Note that an example code layout for the function vecmulg(a, x) is included in Appendix A hereto.

SFEE Features

Various features of SFEE were developed to provide tight control of array sizes to ensure the smallest possible memory footprint. In some embodiments, the arithmetic for the SFEE system is unsigned and field elements are constrained to lGiant integer types by forcing the field elements to reside in the interval [0, p−1], where p is the field prime characteristic. Also, there are no subtract operations in some embodiments of SFEE. Rather, negation of a field element y can be handled modulo p, using the identity $$(-y) \bmod p = w^s - (y+k) \bmod p. \quad (5)$$

In some embodiments of SFEE, modular operations, whether in the field or not, use a "feemod" procedure involving shifts, multiplications, and adds. That is, there are no explicit divisions, which are speed-costly operations. An example of such an efficient "feemod" procedure involving only shifts, multiplications and adds is included in Appendix A. Note that in embodiments involving signature schemes, there can be extra modular reductions with respect to, for example, the point order, which can also benefit from the "feemod" function included in Appendix A. Another feature of SFEE is the avoidance of field inversion operations, which are costly in the sense that Montgomery coordinate pairs (x, z) are used throughout SFEE.

Signature Algorithm

FIG. 1 is a block diagram of one embodiment of a signature signing and verification system 100. The system 100 includes a challenging device 102 coupled to a signing device 104 via an unsecured communications channel. The challenging device 102 and signing device 104 can be any type of memory constrained communication device, including but not limited to, computers, network devices, media players (e.g., music recorders/players), smart cards, email devices, instant messaging devices, mobile phones, digital cameras, personal digital assistants (PDAs), docking stations and the like. The unsecured channel can be any physical and/or wireless link or connection, including but not limited to, buses and networks (e.g., Universal Serial Bus (USB), IEEE 1394 (FireWire™), Ethernet, Internet, WLAN, etc.).

For purposes of this embodiment, it is assumed that certain parameters have been specified, including the parameters s, k, j and word-size w, which are variables in equations (2) and (3) for the prime field characteristic p and the curve order o, respectively. There is an initial public point $P_1=(x_1, 1)$ specified on the elliptic curve with point order dividing o. In some embodiments, the signing device 104 has access to a private key K, which is an lGiant variable type and $K \in [2, o, -2]$. Because o has (s lg w) bits always, the constraint on K can be easily handled by forcing the high bit of an s-word random lGiant to be 0. Then K will have at most ((s lg w)−1) significant bits, the values K=0, 1 are excluded, and the key constraint is effected with no modular operations.

It is also assumed that the signing device 104 has access to a public key $P_{pub}=(x_p, z_p)$ defined by $$(x_p, z_p) = K \cdot (x_1, 1), \quad (6)$$

where $K \cdot (x_1, 1)$ is obtained through elliptic multiplication. For instance, the public key may be obtained from a registry or other trusted source of public keys, or the public key may be obtained from the signing device and then validated by a trusted validation service. In some embodiments, each of the field elements $x_p$ and $z_p$ are an lGiant. Generally, if some lGiant $x \in [2, o-1]$, it suffices to limit x to (s lg w−1) bits and exclude the values x=0, 1.

Referring again to FIG. 1, the challenging device 102 sends a challenge m to the signing device 104. In some embodiments, the challenge m is a random number generated by the challenging device 102. The random number m is constrained to be an integer within the interval $m \in [2, o-1]$. The random number m can be generated by hardware or software or a combination of both. In other embodiments, m can be a message hash derivable by one or both the challenging and signing devices 102, 104. An example of a suitable message hash is the MD5 message-digest algorithm co-developed by MIT Laboratory for Computer Science and RSA Data Security, Inc. While the term "random number" may be strictly defined to mean "a number whose value can not be predicted," for the purposes of this patent document, the term "random number" is defined to mean either a number who value cannot be predicted or a pseudorandom number. A pseudorandom number is a number extracted from a pseudorandom sequence, which is a sequence of values with qualities similar to that of a truly random sequence, but is typically produced by a deterministic function.

Figure 2:
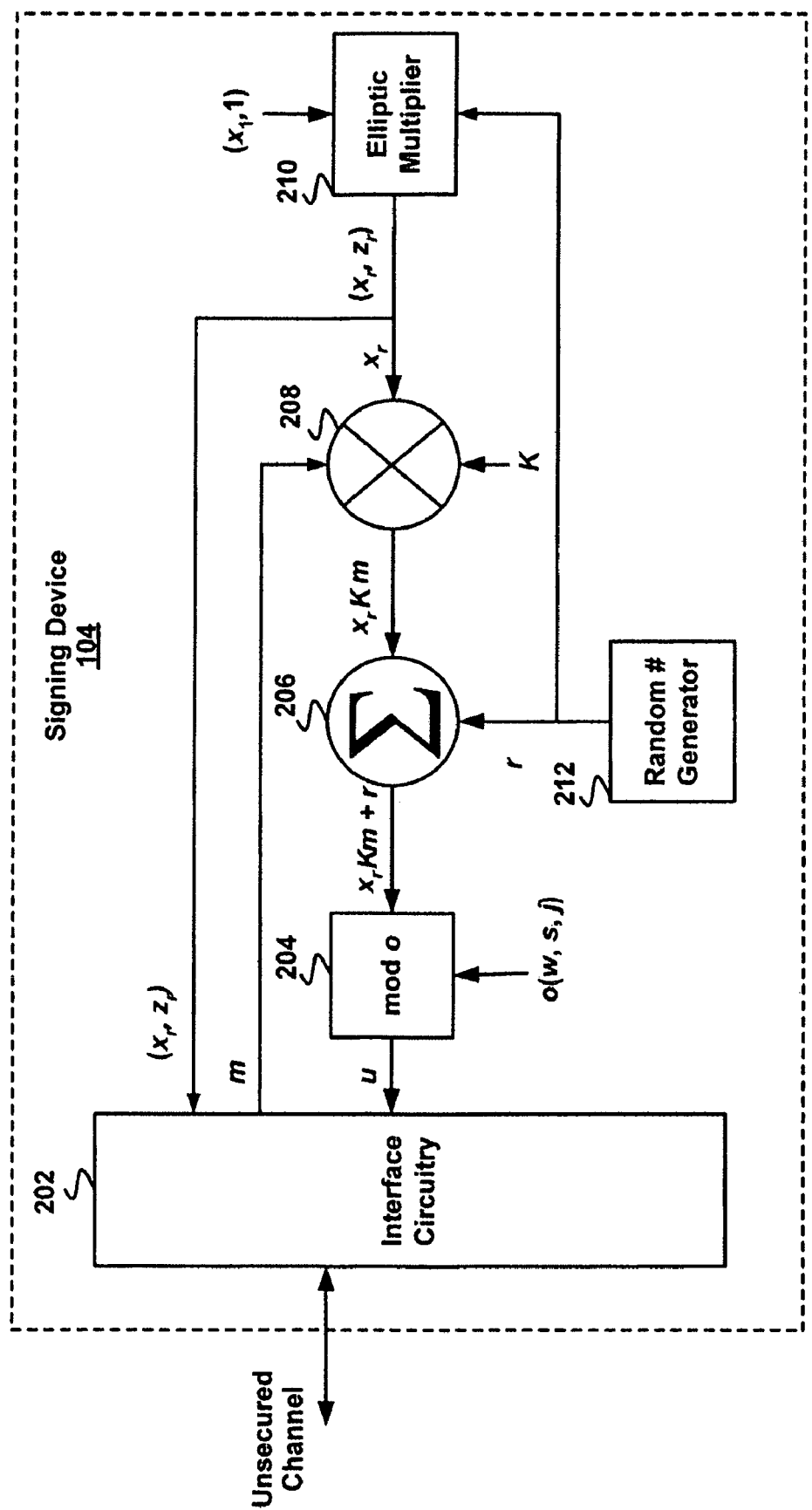
FIG. 2 is a block diagram of one embodiment of the signing device shown in FIG. 1.
Figure 3:
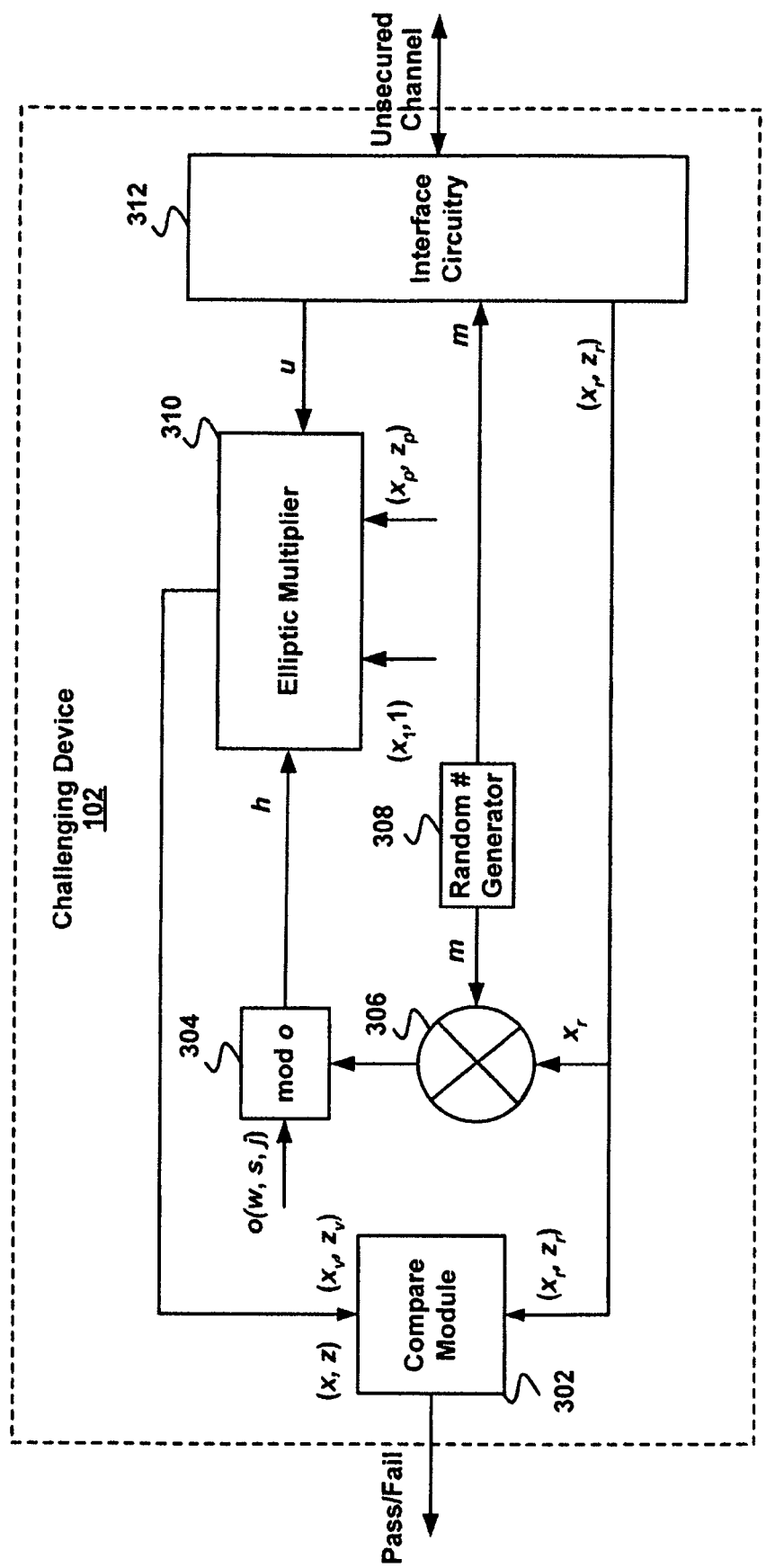
FIG. 3 is a block diagram of one embodiment of the challenging device shown in FIG. 1.
Figure 4:
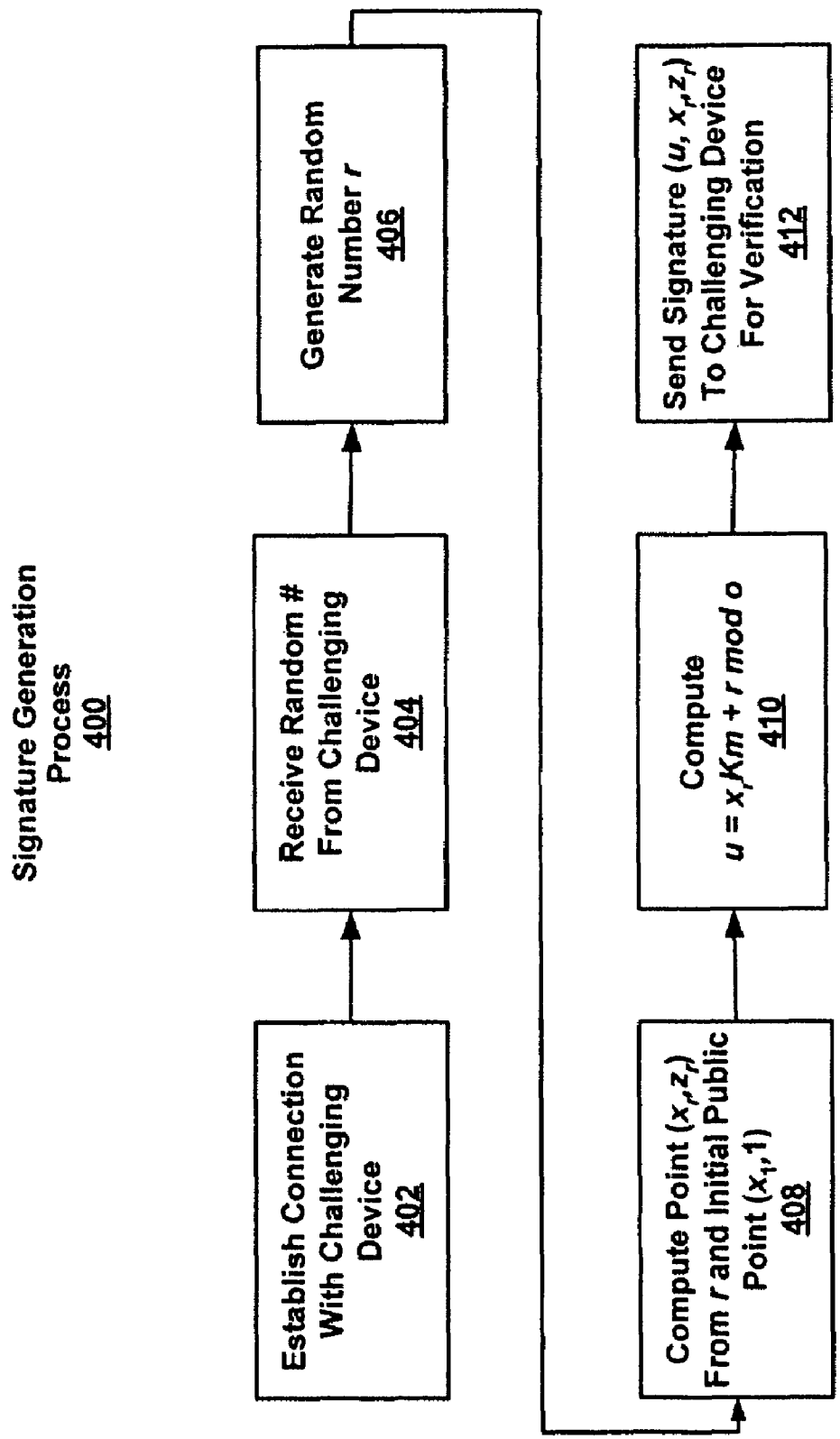
FIG. 4 is a flow diagram of one embodiment of a signature generation process.

The signing device 104 receives the random number m from the unsecured channel and performs the signing operation, as described with respect to FIGS. 2 and 4. The result of the signing operation is a digital signature represented by the parameter triplet (u, $x_r$, $z_r$). The challenging device 102 receives the triplet from the signing device 104 and performs a verification process, as described with respect to FIGS. 3 and 5. If verification results in a valid signature, then a communication session can be established between the challenging device 102 and the signing device 104. The system 100 can be used for a variety of applications requiring digital signature signing and verification. For example, a media player can use the system 100 to prevent unauthorized devices (e.g., computer, smart card, camera, speaker system, accessory devices, etc.) from receiving or sending files or other information from or to the media player. In some embodiments, a successful signature verification allows certain functionality in the challenging device 102 to be accessed or unlocked that otherwise would not have been available to the challenging and/or signing devices 102, 104, as described in U.S. Provisional Patent Application No. 60/642,340, filed Jan. 7, 2005, entitled "Authentication For Electronic Devices."

FIG. 2 is a block diagram of one embodiment of the signing device 104 shown in FIG. 1. The signing device 104 includes interface circuitry 202, mod module 204, summing module 206, multiply module 208, elliptic multiplier module 210 and random number generator 212. Each of the modules, 204, 206, 208 and 210 can be implemented in hardware or software or a combination of both. For example, in some embodiments the modules 204, 206, 208 and 210 are implemented by one or more software functions disclosed in Appendix A.

The interface circuitry 202 includes circuitry for establishing and maintaining a connection and communication session with other devices or with a network. Such circuitry may include a transmitter, a receiver, line drivers, buffers, logic devices, signal conditioning circuitry, etc. If the signing device 104 is wireless, then the interface circuitry 202 would include appropriate wireless circuitry (e.g., a wireless transceiver) for establishing and maintaining a wireless communication session with another device or network. The random number generator 212 can be implemented in software or hardware or a combination of both.

In some embodiments, the challenging device 102 generates a random lGiant type integer m∈[2, o−1] and sends it to the signing device 104 over a communication channel (shown as an unsecured channel in FIG. 2). The random number m is received by the interface circuitry 202 and supplied to the multiply module 208. The multiply module 208 forms a product from the random number m a private key K and the field element $x_r$. The field element $x_r$ is computed by the elliptic multiplier module 210 based on the formula $$(x_r, z_r) = r \cdot (x_1, 1), \tag{7}$$

wherein r is a random number generated by the random number generator 212 and ($x_1$, 1) is an initial public point on the elliptic curve in Montgomery form. Note that in some embodiments, the random number r is an lGiant in the interval [2, o−1] and is further constrained to have a low Hamming weight (e.g., 48). The "1" bits, however, can be in any bit position.

The multiply module 208 forms a product $x_r$km using non-field multiplication, wherein $x_r$ is the x field element of the point ($x_r$, $z_r$) on the elliptic curve, K is a private key (e.g., a bGiant type) and m is the random number sent by the challenging device 102. Using non-field addition, the summing module 206 adds this product to the random number r to form the sum $x_r$Km+r. The mod module 204 reduces this value by the curve order o using fast modular operations (e.g., the "feemod" function in Appendix A) to produce a signature component u given by $$u := (x_r Km + r) \bmod o. \tag{8}$$

The signature component u and the field elements $x_r$, $z_r$ are then sent to the challenging device 102 as a digital signature packet via the interface circuitry 202. Note that u is an lGiant because of the defining constraint o<p, and therefore at most a 3s+3 word signature is sent to the challenging device 102 for verification.

FIG. 3 is a block diagram of one embodiment of the challenging device 102 shown in FIG. 1. The challenging device 102 includes a compare module 302, mod module 304, non-field multiply module 306, random number generator 308, elliptic multiplier module 310 and interface circuitry 312. Each of the modules, 302, 304, 306, and 310 can be implemented in hardware or software or a combination of both. For example, in some embodiments the modules 302, 304, 306, and 310 can be implemented by one or more software functions disclosed in Appendix A.

The challenging device 102 receives the signature packet (u, $x_r$, $z_r$) from the signing device 104. The elliptic multiplier module 310 computes the point $$(x, z) = u \cdot (x_1, 1), \tag{9}$$

wherein u is the signature component of the signature packet received from the signing device 104. The point (x, z) is sent to the compare module 302 where it is used to validate the digital signature.

Next, the multiplication module 306 used non-field multiplication to form a product $x_r$m from the field element $x_r$ received from the signing device 104 and the random number m generated by the random number generator 308. This is the same random number m previously sent by the challenging device and used by the signing device to produce its digital signature. The product $x_r$m is sent to the mod module 304, where it is reduced to a temporary component h using FEE modular operations and a modulus set equal to the curve order o. Thus, the multiplication and modular operations give $$h = x_r m \bmod o \tag{10}$$

The elliptic multiplier module 310 receives the temporary component h and a public key represented by the public point ($x_p$, $z_p$) on the elliptic curve, and performs an elliptic multiplication on these values to give $$(x_v, z_v) = h \cdot (x_p, z_p). \tag{11}$$

After computing equation (10), the points ($x_v$, $z_v$) and ($x_r$, $z_r$) are then sent to the compare module 302 where they are used to validate or invalidate the signature sent by the signing device 104. In some embodiments, the compare module 302 uses the points ($x_v$, $z_v$) and (x, z), and the point ($x_r$, $z_r$) sent by the signing device 104 to determine whether there is an elliptic identity given by $$(x_r, z_r) \pm (x_v, z_v) = (x, z), \quad (12)$$

wherein the elliptic identity is determined by the algebraic expression $$(x_r z_v - z_r x_v)^2 x^2 - 2xz[(x_r x_v + z_r z_v)(x_r z_v + x_v z_r) + 2cx_r x_v z_r z_v] + (x_r x_v - z_r z_v)^2 = 0. \quad (13)$$

In some embodiments, the sigcompare $(x_r, z_r, x_v, z_v, x, z)$ function included in Appendix A calculates the algebraic expression modulo the prime p and returns TRUE if and only if the result is 0. In these embodiments, the sigcompare( ) function uses four auxiliary lGiant variables. Note that the sigcompare( ) function determines whether $P=P_1+/-P_2$ on an elliptic curve, without explicit elliptic addition, as described in U.S. Pat. No. 6,285,760.

FIG. 4 is a flow diagram of one embodiment of a signature generation process 400. While the process 400 described below includes a number of steps that appear to occur in a specific order, it should be apparent that the process 400 can include more or fewer steps, which can be executed serially or in parallel (e.g., using parallel processors or a multi-threading environment).

The process 400 begins when a connection is established (step 402) with a challenging device 102. In some embodiments, the challenging device 102 can be plugged directly into a port (e.g., USB, FireWire™, Ethernet, PCI slots, etc.) of the signing device 104 or vice versa, or otherwise attached via a cable or other physical medium. In other embodiments, a wireless connection is established between the challenging device 102 and the signing device 104 using known wireless protocols and techniques (e.g., IEEE 802.11, etc.). The challenging device 102 and signing device 104 can be physically separate devices from the devices that desire to communicate. For example, one or both devices 102, 104 can be key or dongle (e.g., Xkey™) that is coupled to a port on one or two other devices.

After a connection is established, the challenging device 102 generates and sends a random number m to the signing device 140 as a challenge. The signing device 104 receives the random number m (step 404) and generates another, different, random number r (step 406). In some embodiments, the random numbers m and r are generated local to the devices 102, 104. In other embodiments, the random numbers are generated elsewhere (e.g., network computer) and provided to the devices 102, 104. For example, the random numbers m and r may be downloaded from the Internet or other network as part of a registration process.

Upon generation of a random number r, the signing device 104 computes the public point $(x_r, z_r)$ from r and a initial public point $(x_1, 1)$, as previously described with respect to FIG. 2. (step 408). Next, the signature component u is computed (step 410) using field element $x_r$, m, r and a private key K. If the signature component u is zero, then the process 400 repeats step 406, generates a new random number r and proceeds again. The signature component u is then sent to the challenging device (step 412) as part of a signature packet (u, $x_r, z_r$) for use in the verification process 500 described with respect to FIG. 5.

Figure 5:
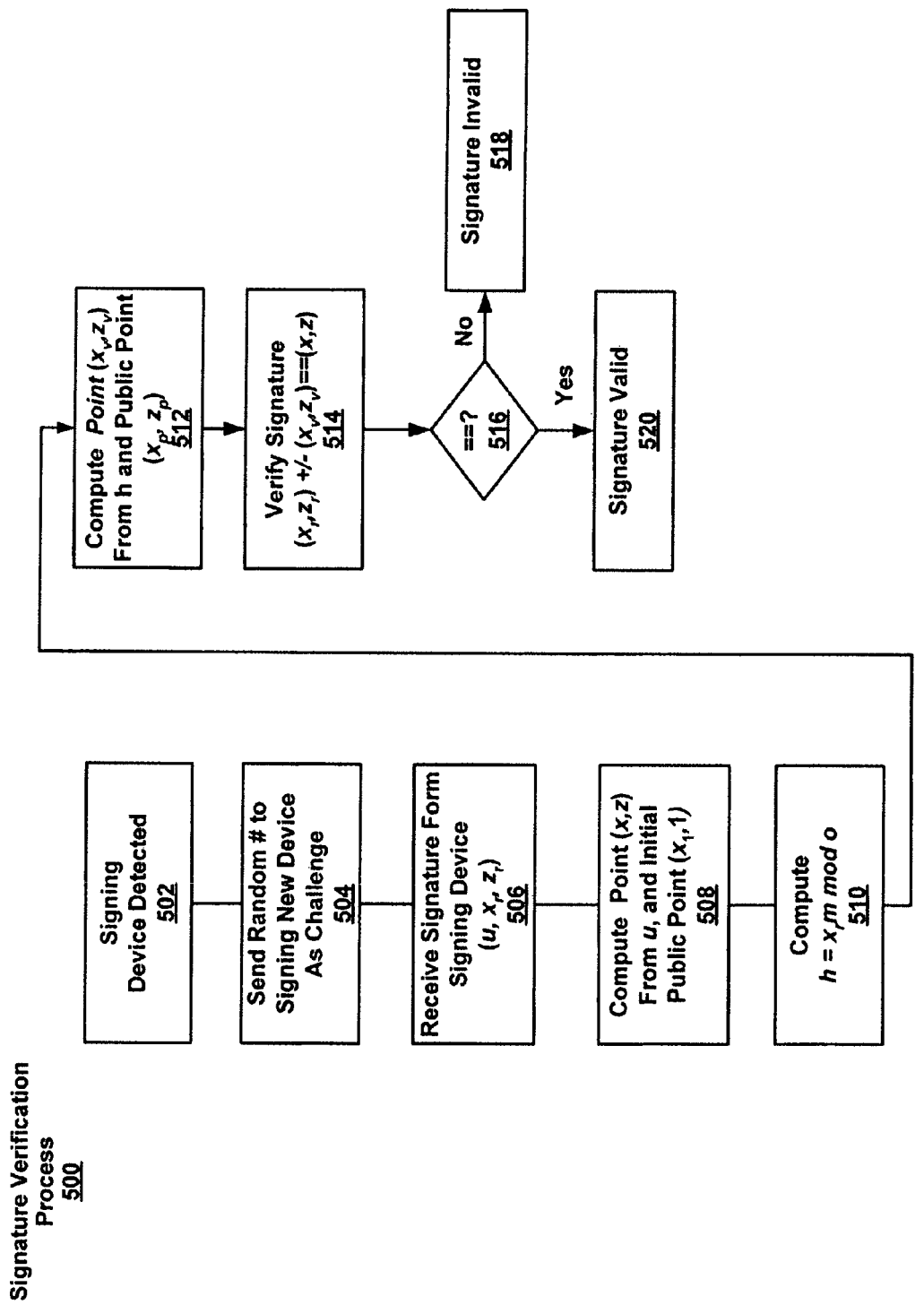
FIG. 5 is a flow diagram of one embodiment of a signature verification process.

FIG. 5 is a flow diagram of one embodiment of a signature verification process 500. While the process 500 described below includes a number of steps that appear to occur in a specific order, it should be apparent that the process 500 can include more or fewer steps, which can be executed serially or in parallel (e.g., using parallel processors or a multi-threading environment).

The process 500 begins when a signing device 104 is detected (step 502). Upon detection of a signing device 104, the challenging device 102 generates a random number m, sends it to the signing device 104 (step 504) as a challenge, then waits for a signature packet (u, $x_r, z_r$) from the signing device 104. When the challenging device 102 receives the signature packet (step 506) it computes the public point (x, z) from the signature component u and the initial public point $(x_1, 1)$ (step 508), as described with respect to FIG. 3. Next, the temporary component h is computed from the field element $x_r$ and the random number m using modular reduction with the modulus set equal to the curve order o (step 510). Another public point $(x_v, z_v)$ is computed from h and the signing device's public key, public point $(x_p, z_p)$ (step 512). The public points (x, z), $(x_r, z_r)$ and $(x_v, z_v)$ are then all provided to a compare module which uses the points to evaluate an elliptic identity, as described with respect to FIG. 3 (step 514). If the elliptic identify is satisfied (step 516), then the signature is deemed valid (step 520). Otherwise, the signature is deemed invalid (step 518).

Figure 6:
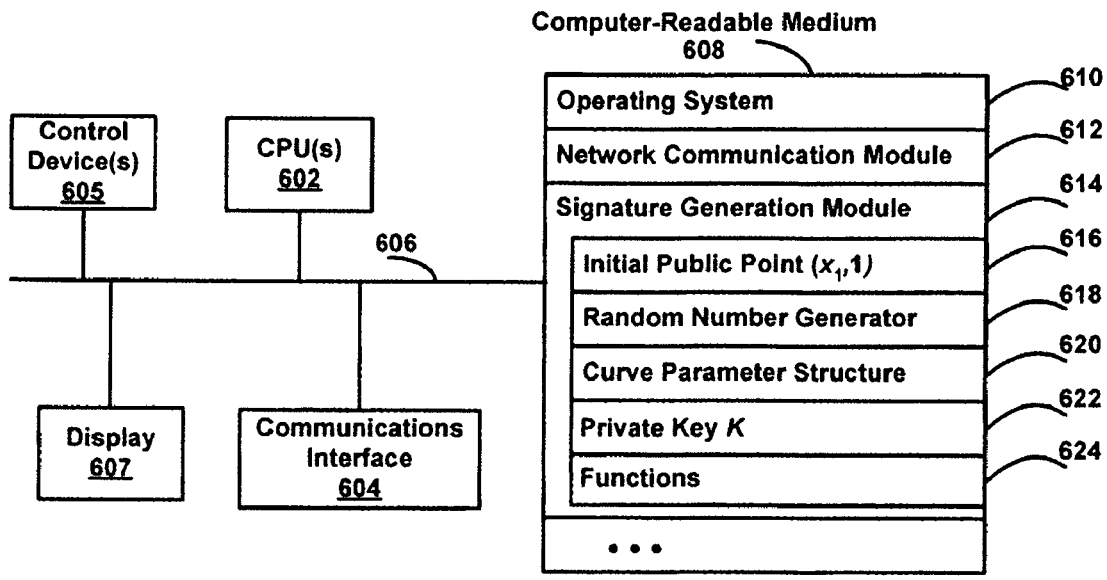
FIG. 6 is a block diagram of one embodiment of a signing device architecture.

FIG. 6 is a block diagram of one embodiment of a signing device 600. The signing device 600 includes a bus 606 coupled to one or more processors 602, a communications interface 604, optional control device(s) 605, optional display device(s) 607 and one or more computer-readable mediums 608. The computer-readable medium(s) 608 can be any device or medium that can store code and/or data for use by the one or more processors 602. The medium can include a memory hierarchy, including but not limited to, cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs).

The signing device 600 can optionally include one or more control devices 605 (e.g., mouse and keyboard, or keypad, touch sensitive display, etc.) and may optionally include a display device 607 (e.g., CRT, LCD, etc.) for enabling a user to communicate and control various aspects of the signing device architecture 600. The communications interface 604 can be a port, network interface card, wireless interface card and the like. In some embodiments, the communications interface is a USB or FireWire™ port for connecting directly with a challenging device 102 or indirectly through a network.

The computer-readable medium 608 includes an operating system 610 (e.g., Mac O/S, Linux, Windows™, Unix, etc.) having various software components and drivers for controlling and managing various tasks (e.g., memory management, hard disc control, power management, etc.). A network communication module 612 includes software programs and/or protocol stacks for establishing and maintaining communication links with other devices or networks via the communications interface 604. The computer-readable medium 608 also includes a signature generation module 614, which includes various software components containing code or instructions for performing or controlling the signature generation process 400 described with respect to FIG. 4. For example, the signature generation module 614 includes the initial public point $(x_1, 1)$ 616, a random number generator 618, a curve parameter structure 620, private key K 622, and various functions 624 for performing the various computations used in SFEE, including but not limited to unsigned finite field arithmetic. The operations of the various software components of the signature generation module 614 have been previously described with respect to FIGS. 2 and 4. Examples of functions 624 for performing various SFEE calculations in the Signature generation process 400 are included in Appendix A. In some embodiments, the random number generator 618 can be implemented completely or partially in hardware, for example, using a set of arithmetic computation circuits (e.g., corresponding to the computational elements 204, 206, 208, 210 shown in FIG. 2) and one or more finite state machines to perform the signature generation process or portions of that process.

Curve Parameter Structure

In some embodiments, the curve parameter structure 620 is used to define a complete set of curve parameters. Preferably, the curve parameter structure 620 has a total word size less than a single lGiant's allocation. An example of such a curve parameter structure 620 is as follows:

```
paramstruct {
    word16 s; // Security exponent.
    word16 k; // The field prime characteristic is p := w^s – k,
        with k ∈ [0, w – 1].

lGiantj; // The curve order is o := w^s – j, with j → count < 1 + s/2.

word16 x1; //The initial public point is P_1 := (x_1, 1).
    word16 c; //Montgomery parameter for elliptic curve
        y^2 = x^3 + cx^2 + x.
}
```

Note that the curve parameter structure 620 disclosed above does not explicitly store the field prime characteristic p or the curve order o. Only one lGiant type is used and all other entries are significantly smaller "word16" types. In this embodiment, the "word16" type is an unsigned integer of 16 bits. If desired, once j is known, the lGiant type can be changed to an even smaller type, since j will typically be about one half the size of an lGiant type. Assuming a word size of $w=2^{16}$, a suitable curve parameter structure 620 would be:
par→s=10; //Selected for desired level of security.
par→k=57; //Selected so the field prime is $p=2^{160}-57$ (which is not explicitly stored).
par→j=13473990657829605964553580; //Selected so the curve order is $o=2^{160}-j$
par→x1=30; //Selected so the public point is $P_1:=(30,1)$, with point order dividing o.
par→c=4; //Selected to provide extra optimization.

With the above parameter assignments, $P_1=(30, 1)$ has a point order=curve order=o:=$w^{10}-j$. The curve order o can be factored as:

$$o = 2^{160} - 13473990657829605964553580$$
$$= 1461501637330929182036834853172172366965336089396$$
$$= 2*2*3*3*40597267703636192172324541258811589908203780261.$$

Thus, the point order of $x_1$, which is also the curve order o, is minimally composite. However, security is still afforded because of the large prime factor of the order. It is well-known that signature schemes work when the order is minimally composite.

Figure 7:
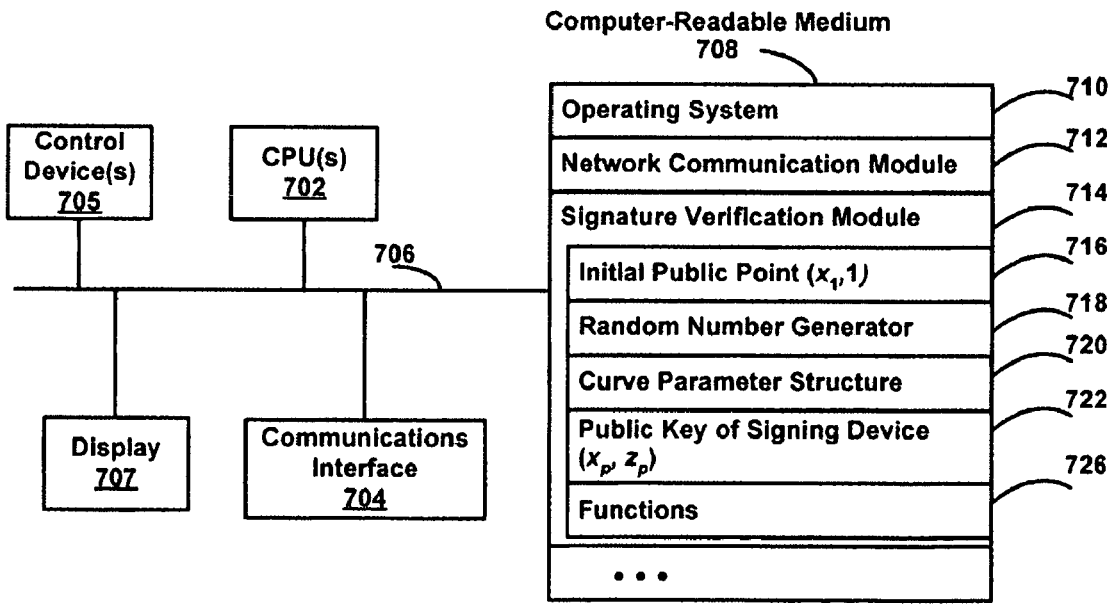
FIG. 7 is a block diagram of one embodiment of a challenging device architecture.

FIG. 7 is a block diagram of one embodiment of a challenging device 700. The challenging device 700 includes a bus 706 coupled to one or more processors 702, a communications interface 704, optional control device(s) 705, optional display device(s) 707 and one or more computer-readable mediums 708. All of these components operate as previously described with respect to FIG. 6.

The computer-readable medium 708 includes an operating system 710 (e.g., Mac O/S, Linux, Windows, Unix, etc.) having various software components and drivers, executable by the processor(s) 702, for controlling and managing various tasks (e.g., memory management, hard disc control, power management, etc.). The network communication module 712 includes software programs and/or protocol stacks (executable by the processor(s) 702) for establishing and maintaining communication links with other devices or a network via the communications interface 704. The computer-readable medium 708 also includes a signature verification module 714, which includes various software components containing code or instructions for generating the various steps of the signature verification process 500 described with respect to FIG. 5. For example, the signature verification module 714 includes the initial public point $(x_1, 1)$ 716, a random number generator 718, a curve parameter structure 720, a public key of the signing device $(x_p, z_p)$, and various functions 724 for performing the various computations used in SFEE, including but not limited to unsigned finite field arithmetic. The operations of the various software components of the signature verification module 714 have been previously described with respect to FIGS. 3 and 5. Examples of functions 724 for performing various SFEE calculations in the signature verification process 500 are included in Appendix A. Note that in some embodiments, the random number generator 718 can be implemented completely or partially in hardware depending upon the platform design. The curve parameter structure 722 operates as previously described with respect to FIG. 6.

Unsigned Finite Field Arithmetic

An advantage of the disclosed embodiments is the use of unsigned finite field arithmetic. Appendix A includes code layouts of examples of functions that can be used in SFEE calculations. These example functions have been specifically designed for small memory environments and minimize the amount of memory allocated to a memory stack. In some embodiments, the amount of storage allocated for the memory stack to perform a signature generation operation does not exceed the amount of storage required to store several lGiant values, one bGiant value and a predetermined number of n-byte length fields per lGiant or bGiant. In some embodiments, the amount of storage allocated for storing temporary values in a memory stack to perform a signature generation operation does not exceed an amount of storage associated with 7 1lGiants and 1 bGiant, plus a 2-byte length field. In some embodiments, the amount of storage allocated for storing temporary values in a memory stack to perform a signature verification operation does not exceed an amount of storage associated with 8 lGiants and 1 bGiant, plus a 2-byte length field. In an embodiment in which an lGiant value requires 22 bytes of storage and a bGiant value requires 40 bytes of storage, the stack allocation required to store temporary values while performing a signature generation operation does not exceed 200 bytes, plus a small amount of memory for storing procedure return information. The stack allocation required to perform a signature verification operation does not exceed 230 bytes, plus a small amount of memory for storing procedure return information.

In some embodiments, the amount of storage allocated for storing temporary variable to perform a signature generation operation does not exceed an amount of storage associated with 10 lGiants, where the storage associated with an lGiant is the amount of storage required to store the largest value in the finite field of integers in which the signature verification operation is performed. Similarly, in some embodiments, the amount of storage allocated for storing temporary variable to perform a signature verification operation does not exceed an amount of storage associated with 11 lGiants, where the storage associated with an lGiant is the amount of storage required to store the largest value in the finite field of integers in which the signature verification operation is performed.

The functions can be implemented in any suitable software language (e.g., "C" code, assembly language, etc.) or hardware (e.g., digital signal processors, ASICs, microprocessors, etc.). The example functions included in Appendix A assume a priori the existence of fundamental giant-integer operations, where each of the example functions listed in Table I below involves either lGiant types, bGiant types, or a combination of both.

TABLE I

Example SFEE Functions

| Function Name | Function | Inputs | Outputs |
|---|---|---|---|
| iaddg(a, y) | non-field addition of a word and a giant | word a<br>lGiant y | lGiant y |
| addg(x, y) | non-field addition of two giants | lGiant x<br>lGiant y | lGiant y |
| mulg(x, y) | non-field multiplication of two giants | lGiant x<br>lGiant y | lGiant y |
| squareg(y) | non-field square of giant. | lGiant | lGiant |
| vecmulg(a, y) | non-field vector multiplication of giant | word a<br>lGiant y | lGiant y |
| gtog(x, y) | copying a lGiant to a bGiant | lGiant or bGiant or word | lGiant y or bGiant |
| itog(a, y) | copying a word to a giant | word a<br>lGiant y | lGiant y |
| boolean isZero(y) | checking if a giant is zero | lGiant y | Boolean |
| gshiftwordsright(a, y) | right-shifting by a given word count | word a<br>lGiant y | lGiant y |
| justg(y) | justifying a giant to have the correct word count | lGiant y | lGiant y |
| fadd(x, y, par) | field addition of two giants | lGiant x<br>lGiant y<br>paramstruct par | lGiant y |
| fneg(y, par) | field negation of giant | lGiant y<br>paramstruct par | lGiant y |
| fsub(x, y, par) | field subtraction of two giants | lGiant x<br>lGiant y<br>paramstruct par | lGiant y |
| fmul(x, y, par) | field multiplication of two giants | lGiant x<br>lGiant y<br>paramstruct par | lGiant y |
| fsmul(a, y, par) | field multiplication of a word and giant | word a<br>lGiant y<br>paramstruct par | lGiant y |
| fsquare(y, par) | field square a giant | lGiant y<br>paramstruct par | lGiant y |
| feeMod(y, par, mod) | fast elliptic encryption modular reduction of giant | word mod<br>lGiant y<br>paramstruct par | lGiant y |
| boolean sigcompare(x1, z1, x2, z2, x, z, par) | signature compare using giants | lGiant x1<br>lGiant z1<br>lGiant x2<br>lGiant z2<br>lGiant x<br>lGiant z<br>paramstruct par | Boolean |

TABLE I-continued

Example SFEE Functions

| Function Name | Function | Inputs | Outputs |
|---|---|---|---|
| elleven(x1, z1, x2, z2, par) | Montgomery even ladder arithmetic on giants | lGiant x1<br>lGiant z1<br>lGiant x2<br>lGiant z2<br>paramstruct par | lGiant x1<br>lGiant z1<br>lGiant x2<br>lGiant z2 |
| ellodd(x1, z1, x2, z2, x, z, par) | Montgomery odd ladder arithmetic on giants | lGiant x1<br>lGiant z1<br>lGiant x2<br>lGiant z2<br>lGiant x<br>lGiant z<br>paramstruct par | lGiant x1<br>lGiant z1<br>lGiant x2<br>lGiant z2<br>lGiant x<br>lGiant z |

Note that the "feemod" function includes the integer "whichmod" for enabling the use of a different modulus in the FEE modular reduction. For this particular embodiment, if whichmod==0, the prime characteristic p is used as the modulus. When whichmod !=0, then the curve order o is used as the modulus. One example of using whichmod !=0 would be for computing the signature component given by $$u:=(K*m+r) \bmod o, \tag{14}$$

where m is a message to be encrypted and K is the public key of the challenging device 102 and not the k parameter in the curve order field prime equation $p:=w^s-k$. This basic signature scheme was described more fully in U.S. Pat. No. 6,285,760.

An advantage of the example functions included in Appendix A and summarized in Table I is the ability to operate in a small memory environment while still maintaining robust security. Specifically, these example functions provide small memory implementations of fast elliptic encryption (FEE) through the use of: 1) Montgomery algebra, 2) compact curve parameter structures, 3) small memory finite field arithmetic, 4) special fast primes, and 5) fast modular arithmetic with respect to either field prime characteristic p or curve order o. In addition to the signature generation and verification processes 400, 500, the functions in Appendix A can be used with any of the FEE techniques described in U.S. Pat. No. 6,285,760, with little or no modifications.

SFEE Stack Memory Allocation

Figure 9:
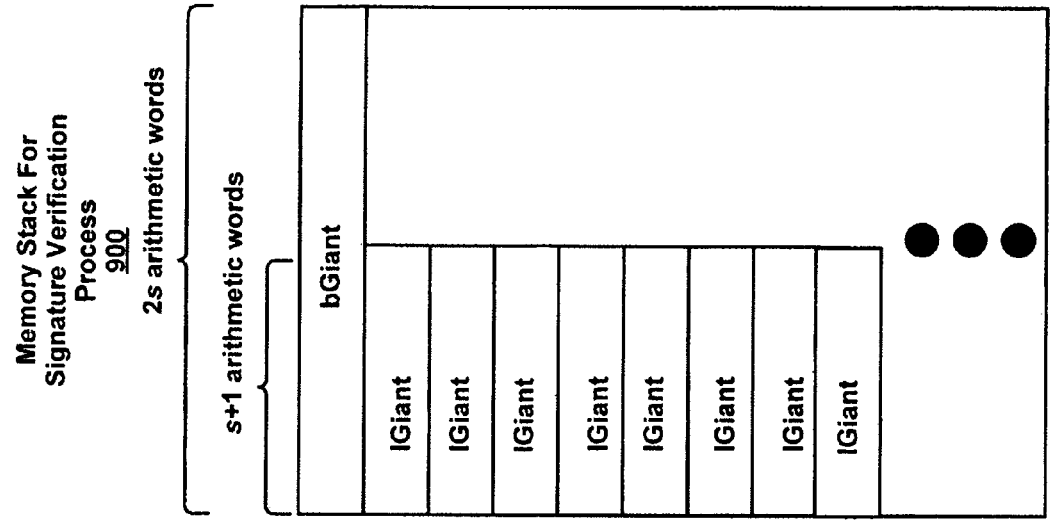
FIG. 9 is an illustration of a memory stack for the signature verification process of FIG. 5.
Figure 8:
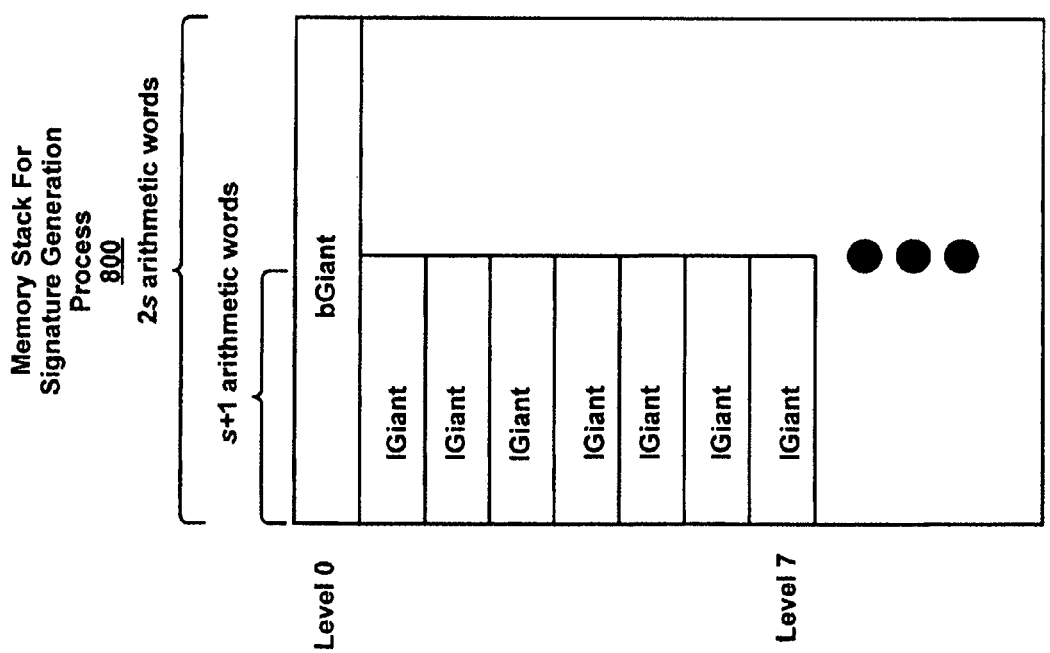
FIG. 8 is an illustration of a memory stack for the signature generation process of FIG. 4.

The example functions included in Appendix A reduce the total number of stack memory allocations during signature signing and verification. FIGS. 8 and 9 are illustrations of a memory stack operations for the signature generation and verification processes 400, 500, described with respect to FIGS. 4 and 5, respectively. FIG. 8 illustrates that the signature generation process 400 can be implemented by allocating at most 1 temporary bGiant and 7 temporary lGiants on the stack. Assuming an lGiant is 22 bytes and a bGiant is 40 bytes, then the maximum number of bytes allocated to the memory stack for temporary giants is on the order of 200 bytes. Similarly, FIG. 9 illustrates that the signature verification process 500 can be implemented by allocating at most 1 temporary bGiant and 8 temporary lGiants on the stack. Assuming an lGiant is 22 bytes and a bGiant is 40 bytes, then the maximum number of bytes allocated to the stack for temporary giants is on the order of 226 bytes. Thus, with this particular embodiment, the entire signature generation and verification process will take at most 200 bytes of memory in the signing device and 226 bytes of memory in the challenging device 102, thus making this embodiment suitable for small memory environments.

Note that FIGS. 8 and 9 are illustrative and do not imply that bGiants are always at the top of the memory stack. Additionally, this embodiment does not use global variables or dynamically allocated memory (e.g., no malloc( ) calls are made). Also, the number of local variables is reduced by sharing temporary storage.

The disclosed embodiments are not intended to be exhaustive or limited to the precise forms disclosed. Many modifications and variations to the disclosed embodiments are possible in view of the above teachings.

APPENDIX A

Example Functions

A. Code Layout for Finite Field Arithmetic

©2005 Apple Computer. All rights reserved.

```
fadd(lGiant x, lGiant y, paramstruct par)
// y := (x + y) mod p.
{
addg(x, y); // An lGiant ((s+1)-words capacity) can absorb any carry.
feeMod(y, par, 0); // Call feeMod with respect to modulus p.
}
fneg(lGiant y, paramstruct par)
// y := (-y) mod p.
{
if(isZero(y)) return;
fadd(par->k, y, par);
for(j = 0; j < y->count; j++) y->n[j] = (y->n[j]); // Complement.
for(j = y->count; j < s; j++) y->n[j] = 65535; // Complement 0.
y->count = s;
justg(y); // Justify y to have correct y->count;
iaddg(1, y); // y := 1 + y.
}
fsub(lGiant x, lGiant y, paramstruct par)
// y := (y-x) mod p.
{ // Assume one lGiant L1.
gtog(x, L1); //L1=x
fneg(L1, par);
fadd(L1, y, par);
}
fmul(lGiant x, lGiant y, paramstruct par)
// y := (x*y) mod p.
{// Assume bGiant B1.
gtog(y, B1);
mul(x, B1);
feeMod(B1 , par, 0); // Call feeMod with respect to modulus p.
gtog(B1, y);
}
fsmul(word16 a, lGiant y, paramstruct par)
// y := (a*y) mod p, but a is a word.
{// No local giants needed.
vecmulg(a, y);
feeMod(y, par, 0); // Call feeMod with respect to modulus p.
}
fsquare(lGiant y, paramstruct par)
// y := (y*y) mod p.
{// Assume bGiant B1.
gtog(y, B1);
squareg(B1);
feeMod(B1, par, 0); // Call feeMod with respect to modulus p.
gtog(B1, y);
}
```

B. Code Layout For FEE Modular Reduction Function

©2005 Apple Computer. All rights reserved.

```
feeMod(giant z, paramstruct par, int whichmod)
// z can be any-size giant, yet will get reduced to lGiant size,
// reduced in fact to interval [0, modulus-1] where modulus is given by:
// when whichmod == 0, z := z mod p;
// when whichmod != 0, z := z mod o.
{// Assume lGiant L1.
s = par->s;
while(z->count > s) { for(j = 0; j < s; j++) L1->n[j] = z->n[j]; // Copy words.
L1->count = s;
justg(L1);
gshiftwordsright(s, z); // Right-shift z by s words.
if(whichmod) mulg(par -> j, z); // Mul by giant par -> j.
else vecmulg(par -> k, z); // Mul by single word par -> k.
addg(L1, z);
} //Here, z->count <= s.
if(z->count < s) return;
if(z->n[s-1] < word) return;
// At this juncture, z might be greater than p..
gtog(z, L1);
if(whichmod) addg(par -> j, z); // Giant add of par -> j.
else iaddg(par -> k, z); // Word add of par -> k.
if(z->count > s) { --(z->count);
justg(z);
} else (gtog(L1, z);
}
}
```

C. Code Layout for Signature Comparison Function

©2005 Apple Computer. All rights reserved.

```
boolean sigcompare(lGiants x1, z1, x2, z2, x, z, parstruct par)
// Asks whether (x1,z1) ± (x2, z2) = (x,z) on the elliptic curve.
{// Assume local lGiants a1, a2, b1, b2.
// Note that some of the passed lGiants will be modified.
gtog(x1, a1); fmul(x2, a1, par); // a1 := x1 x2 in the field.
gtog(x1, a2); fmul(z2, a2, par); // a2 := x1 z2.
gtog(z1, b1); fmul(z2, b1, par); //b1 = z1 z2.
gtog(z1, b2); fmul(x2, b2, par); // b2 = z1 x2.
gtog(a2, x1); fsub(b2, x1, par); fsquare(x1, par);
fmul(x, x1, par); fmul(x, x1, par);
gtog(a1, x2); fsub(b1, x2, par); fsquare(x2, par);
fmul(z, x2, par); fmul(z, x2, par);
fadd(x2, x1, par);
gtog(a2, x2); fadd(b2, x2, par);
gtog(a1, z1); fadd(b1, z1, par); fmul(z1, x2, par);
itog(par->c, z1); fmul(a2, z1, par); fmul(b2, z1, par); fadd(z1, z1, par);
fadd(z1, x2, par); fmul(x, x2, par); fmul(z, x2, par);
fadd(x2, x2, par);
fsub(x2, x1, par);
if(isZero(x1)) return "TRUE: signature verified";
return "FALSE: signature not verified";
}
```

D. Code Layout for Small Memory Elliptic Multiplication

©2005 Apple Computer. All rights reserved.

```
elleven(lGiants x1, z1, x2, z2, parstruct par)
// Here equipped with field arithmetic for minimal-memory usage.
{// Assume auxiliary lGiants t1, t2, t3;
gtog(x1, t1); fsquare(t1 , par); // t1 := x1*x1.
gtog(z1, t2); fsquare(t2, par); // t2 := z1*z1.
gtog(x1, t3); fmul(z1, t3, par);
gtog(t3, z2); fsmul(par->c, z2, par);
fadd(t1, z2, par); fadd(t2, z2, par); fmul(t3, z2, par); fsmul(4, z2, par);
```

-continued

```
gtog(t11, x2); fsub(t2, x2, par);
fsquare(x2, par);
}
ellodd(lGiants x1, z1, x2, z2, x, z, parstruct par)
// Here equipped with field arithmetic for minimal-memory usage.
{// Assume auxiliary lGiants t1, t2;
gtog(x1, t1); fmul(x2, t1, par);
gtog(z1, t2); fmul(z2, t2, par);
fsub(t2, t1, par);
gtog(z1, t2); fmul(x2, t2);
gtog(t1, x2); fsquare(x2, par);
fmul(x1, z2); fsub(t2, z2, par); fsquare(z2, par);
fmul(x, z2, par);
fmul(z, x2, par);
}
```

What is claimed is:

1. A digital signature generation system, comprising:
 a processor;
 a computer readable medium coupled to the processor and having stored thereon instructions, which, when executed by the processor, cause the processor to perform the operations of:
 generating a first random number from a finite field of numbers;
 generating a plurality of field elements defining a first point on an elliptic curve defined over the finite field of numbers by performing elliptic curve arithmetic on the first random number and an initial public point on the elliptic curve;
 generating a product from a field element of the plurality of field elements, a private key, and a second random number from the finite field of numbers, wherein the second random number is received from a challenger device;
 generating a signature component by summing the product and the first random number;
 reducing the generated signature component using one or more modular reduction operations, wherein the one or more modular reduction operations are based on a modulus equal to an order of the elliptic curve; and
 sending the reduced signature component and the plurality of field elements to the challenger device as a digital signature for verification by the challenger device.

2. The system of claim 1, wherein one or more of the generating steps uses unsigned field arithmetic.

3. The system of claim 1, wherein the elliptic curve has a curve order $o=w^s-j$, wherein w is n-bit segment of computer memory, and s and j are positive integers.

4. The system of claim 3, wherein the first random number is an integer constrained to reside in the interval [2, o−1].

5. The system of claim 3, wherein j is greater than 0 and less than $w^{1+s/2}$.

6. The system of claim 1, wherein the plurality of field elements is a Montgomery coordinate pair.

7. The system of claim 1, wherein the elliptic curve is defined in an x-y coordinate plane by the equation $y^2=x^3+cx^2+x$.

8. The system of claim 7, wherein c is equal to 4.

9. The system of claim 3, wherein the initial public point on the elliptic curve has a point order that divides the curve order o and contains the largest prime factor in the curve order o.

10. The system of claim 1, wherein the field elements of the plurality of field elements reside in an interval [0, p−1], wherein p is a field prime.

11. The system of claim 2, wherein the field arithmetic includes modular operations that are performed without explicit divisions.

12. The system of claim 2, wherein subtract operations on a field element of the plurality of field elements are performed by negating the field element using the identity (−y)mod p=$w^s$−(y+k)mod p, where y is the field element to be negated, p is a field prime, w is an n-bit segment of memory, and j and k are positive integers.

13. The system of claim 2, wherein the field arithmetic does not use field inversion operations.

14. The system of claim 1, wherein the first random number has a Hamming weight less than or equal to 48.

15. The system of claim 2, wherein the field arithmetic does not use dynamically allocated memory.

16. The system of claim 2, wherein a maximum number of bytes of memory allocated for temporary storage of variables used by field arithmetic operations used to generate the digital signature does not exceed 200 bytes.

17. The system of claim 2, wherein at least one temporary variable used by the field arithmetic is shared by at least two field arithmetic operations.

18. The system of claim 2, wherein the digital signature sent to the challenger device is a packet not exceeding 3s+3 memory segments w, wherein s represents the number of n-bit memory segments w used to store unsigned integer values for the reduced signature component and the plurality of field elements sent to the challenger device as a representation of the digital signature.

19. The system of claim 2, wherein the computer-readable medium includes a data structure for storing five parameters used to generate the digital signature, wherein four parameters are stored in no more than s+1 n-bit memory segments w and one parameter is stored in no more than 2s n-bit segments w, where s is a positive integer.

20. The system of claim 19, wherein s is equal to 10 and n is equal to 16.

21. A computer-implemented method of generating a digital signature, comprising:
 at an electronic device comprising one or more processors and a communications interface coupled to a challenger device:
 generating a first random number from a finite field of numbers;
 generating a plurality of field elements defining a first point on an elliptic curve defined over the finite field of numbers by performing elliptic curve arithmetic on the first random number and an initial public point on the elliptic curve;
 generating a product from a field element of the plurality of field elements, a private key, and a second random number from the finite field of numbers, wherein the second random number is received from the challenger device;
 generating a signature component by summing the product and the first random number;
 reducing the generated signature component using one or more modular reduction operations, wherein the one or more modular reduction operations are based on a modulus equal to an order of the elliptic curve; and
 sending the reduced signature component and the plurality of field elements to the challenger device as a digital signature for verification by the challenger device.

22. A computer-readable medium having stored thereon instructions, which, when executed by a processor in a system for generating a digital signature, causes the processor to perform the operations of:

generating a first random number from a finite field of numbers;

generating a plurality of field elements defining a first point on an elliptic curve defined over the finite field of numbers by performing elliptic curve arithmetic on the first random number and an initial public point on the elliptic curve;

generating a product from a field element of the plurality of field elements, a private key, and a second random number from the finite field of numbers, wherein the second random number is received from a challenger device;

generating a signature component by summing the product and the first random number;

reducing the generated signature component using one or more modular reduction operations, wherein the one or more modular reduction operations are based on a modulus equal to an order of the elliptic curve; and sending the reduced signature component and the plurality of field elements to the challenger device as a digital signature for verification by the challenger device.

* * * * *

UNITED STATES PATENT AND TRADEMARK OFFICE
CERTIFICATE OF CORRECTION

PATENT NO. : 7,607,019 B2  Page 1 of 1
APPLICATION NO. : 11/051441
DATED : October 20, 2009
INVENTOR(S) : Crandall et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1296 days.

Signed and Sealed this

Twelfth Day of October, 2010

David J. Kappos
*Director of the United States Patent and Trademark Office*